United States Patent [19]

Harter

[11] 3,756,719

[45] Sept. 4, 1973

[54] HIGH EFFICIENCY INTEGRATOR BOX
[75] Inventor: James E. Harter, Webster, N.Y.
[73] Assignee: Eastman Kodak Company, Rochester, N.Y.
[22] Filed: Apr. 17, 1972
[21] Appl. No.: 244,486

[52] U.S. Cl. .................................. 355/67, 240/3.1
[51] Int. Cl. ............................................ G03b 27/54
[58] Field of Search ................... 355/67, 32, 35, 37, 355/70; 240/3.1

[56] References Cited
UNITED STATES PATENTS
3,488,117   1/1970   Weisglass ........................... 355/70 X
3,561,867   2/1971   Simmon .............................. 355/67
3,630,609   12/1971  Clapp et al. ........................ 355/37

Primary Examiner—Samuel S. Matthews
Assistant Examiner—Richard A. Wintercorn
Attorney—W. H. J. Kline et al.

[57] ABSTRACT

An improved integrator box for use in a high intensity lamphouse to produce reflection images of the lamphouse aperture to increase the illumination uniformity. A plurality of triangular shaped reflectors are placed within the integrator box of the lamphouse. By proper location and sizing of the reflectors supplementary first reflection images of the light source can be directed into the quandrant centers of the printing plane.

4 Claims, 3 Drawing Figures

HIGH EFFICIENCY INTEGRATOR BOX

BACKGROUND OF THE INVENTION

1. Field of the Invention

This invention relates to a light integrator box and more particularly to an improved light integrator box for use with a high intensity lamphouse such as might be incorporated in a professional photographic device.

2. Description of the Prior Art

In certain apparatus for the projection of transparencies, a light source of non-uniformity of cross-section is utilized. An image of the more uniformly radiating, central portion of the light source is enlarged to cover a masking aperture located between the source and the projection lens. The masking aperture is therefore illuminated with substantial uniformity while the less uniform light eminating from other areas of the source is masked from the projection lens. This masking technique provides somewhat satisfactory uniformity of illumination but involves the wasting of a large percentage of the light content of the beam at the aperture.

A device for salvaging a portion of the wasted light is shown in U.S. Pat. No. 2,604,005. In this patent a part of the wasted, non-uniform, light is redirected by reflection to pass through the aperture. This is accomplished by providing an elongated light transmitting structure with highly reflective internal surfaces and having an enlarged inlet opening for receiving the light beam. The reflective surfaces converge inwardly toward the outlet opening to redirect the collected light to a masking aperture. The redirection is accomplished so as to more evenly distribute the light throughout the area of the masking aperture. While illumination uniformity will improve by this reflection technique, further improved uniformity is desirable in photographic printing devices.

SUMMARY OF THE INVENTION

It is the object of this invention to establish high illumination uniformity level for high intensity projection lamps suitable for use in professional photographic printing devices.

Another object is to make more efficient use of a high intensity projection lamp found in professional photographic printing devices.

A further object is to provide an improved integrator box of simple construction for establishing the desired high illumination uniformity level.

There is accordingly herein provided an improved integrator box located between the projection lamp and the focal plane of the transparency to be projected. The integrator box has highly reflective interior walls with particularly shaped reflectors added to the interior of the integrator box. By proper sizing of the reflectors additional first reflection images may be added to the projection image of the lamphouse, the additional images being directed into the quandrant centers of the projection plane to accomplish more uniform illumination thereof.

DESCRIPTION OF THE PREFERRED EMBODIMENT

Figure 1:
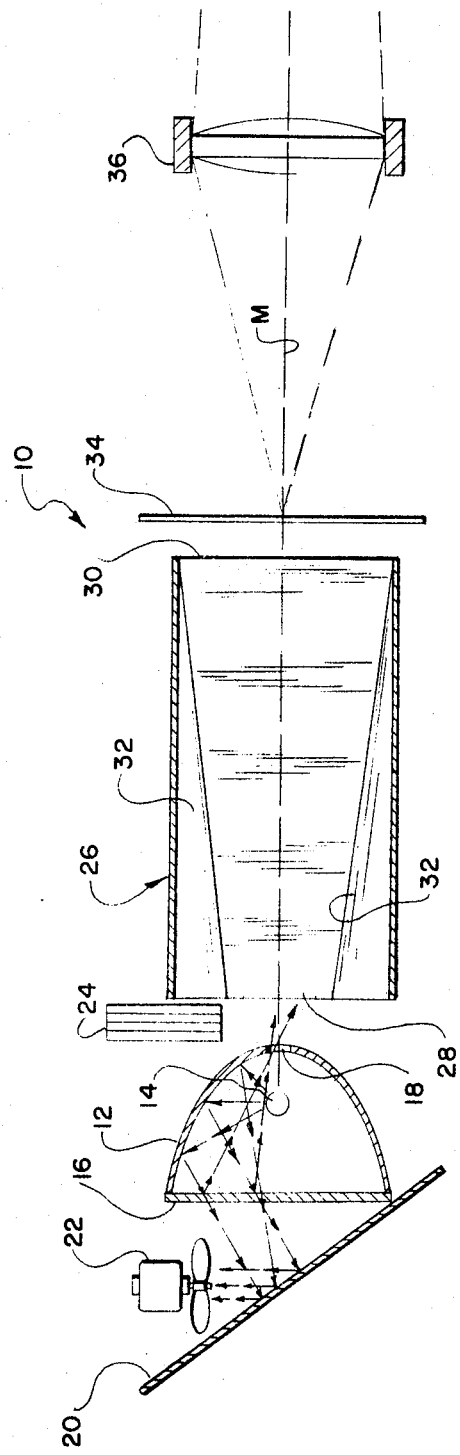
FIG. 1 illustrates a lamphouse system incorporating the integrator box according to this invention.

Referring now to the drawings, FIG. 1 shows a lamphouse system 10 having an ellipsoidal reflector 12 in which a projection lamp 14 is positioned near the focal point of the ellipse. A cold mirror 16 intersects the major axis M of the ellipsoidal reflector 12 at a location spaced from what would be the minor axis of the ellipsoidal reflector 12 to a distance equal to one-half the distance of the lamp 14 from an aperture 18 at the vertex of the ellipse. By so positioning the cold mirror 16, the mirror will serve to reflect light rays from the lamp 14 through the aperture 18 at the vertex of the ellipsoidal reflector 12, while permitting the passage of heat rays through the mirror. The heat rays are directed to strike a metal mirror 20 for deflection and removal by an exhaust fan 22. The light rays radiating from the aperture 18 may be passed through a series of subtractive filters, a heat screen, a neutral density filter and a dark shutter which are selectively placed in the optical path (these elements are of standard configuration and form no part of this invention), these elements being designated as a group with the numeral 24.

Immediately adjacent the combined elements 24 is an integrator box 26 having an entrance end 28 and an exit end 30. The integrator box 26 has a basic rectangular external shape with a substantially square cross-section and highly reflective interior walls. In order to establish the illumination uniformity level according to this invention, the integrator box 26 is provided with triangularly shaped reflectors 32 which have the base thereof intersecting the entrance end 28 of the integrator box 26, such that the projecting opening becomes of octagonal shape (see FIG. 3). An apex of each reflector 32 is located at an intersection of two adjacent sides of the integrator box 26 such that the reflecting surfaces diverge outwardly from the projection path of the lamp image as it progresses through the integrator box 26. Adjacent the exit end 30 of the integrator box 26 is the negative focal plane 34 and the projection lens 36 which receives the image from the negative focal plane 34 as projected by the light from the lamp 14.

Figure 2:
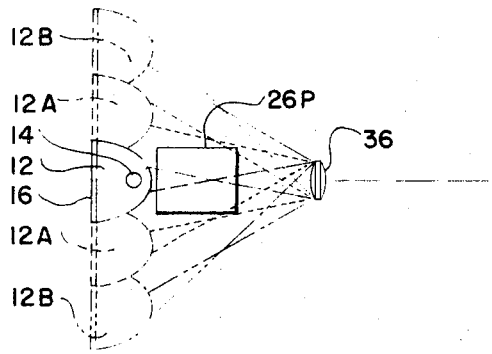
FIG. 2 illustrates the projection onto a printing plane of the lamphouse image through the integrator box of the prior art, with the virtual images of the reflection images being shown.

In order to better illustrate the importance of the triangular reflectors 32 and their particular orientation within the integrator box 26 for illumination uniformity, the right hand portion of FIG. 2 illustrates what the projection lens 36 actually sees (rotated 90° about the vertical axis) inside of an integrator box 26p, in the left hand portion of FIG. 2, of generally square cross-sectional construction as found in the prior art. In the fashion of a kaleidoscope, aperture 18 of the ellipsoidal reflector 12, adjacent one end of the integrator box 26p, has mirror images which extend infinitely in the side wall reflectors of the box. A number of these images are shown in the right hand view of FIG. 2, with image F being the actual illumination image through the reflector aperture 18 and brightest image that the lens will see and images $F_1$, $F_2$, $F_3$ and $F_4$ being reflection images of the order designated by the subscript thereof; i.e. $F_1$ being a first reflection image, $F_2$ being a second reflection image. Virtual images of the reflection images are shown in the left hand portion of FIG.

2 with 12A corresponding to $F_1$ and 12B corresponding to $F_2$.

Figure 3:
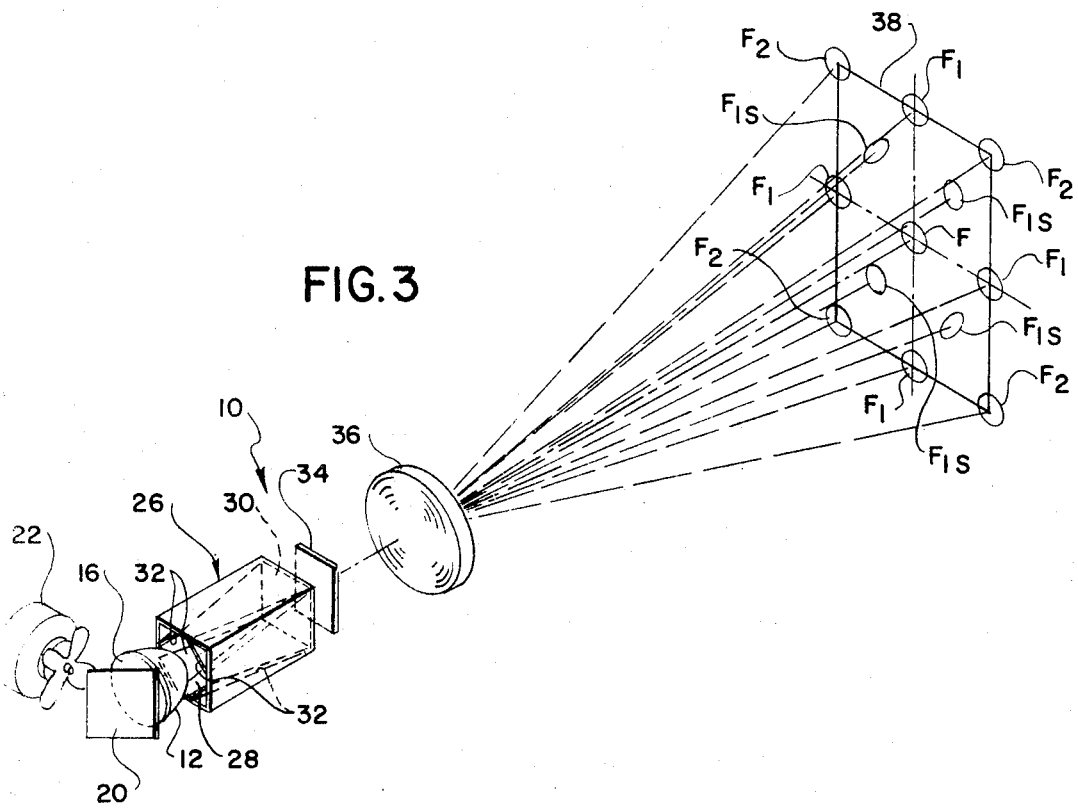
FIG. 3 illustrates the projection of the lamphouse image through the integrator box, according to the present invention, onto a projection plane showing the additional first reflection images.

The projection of lamp onto an exposure area through the integrator box 26p (without diffusion) would yield individual images such as F, $F_1$ and $F_2$ as shown in FIG. 3. However, with the addition of the triangular reflectors 32 to the integrator box 26 according to the invention, there will be additional first reflection images $F_{1S}$. The location of the reflectors 32 so as to give the desired additional first reflection images $F_{1S}$, may be ascertained by conventional ray tracing techniques. Depending upon the length of the integrator box 26 and the optics involved, the ray tracing will enable a determination of the size of the reflectors 32 and the particular location relative to the walls of the integrator box. Without any diffusion being present, the illumination images F, $F_1$, $F_2$ and $F_{1S}$ would appear on an exposure area 38 as is shown in FIG. 3. The aperture illumination image F and the first and second reflection images $F_1$, $F_2$ are the same images as would be found in the projection through the integrator box 26p of the prior art. As is readily apparent the supplemental first reflection images $F_{1S}$ gives a far superior illumination uniformity to the exposure area 38 by markedly increasing the first reflection images projected thereon. With the addition of light diffusion means, such as within the integrator box 26 adjacent the aperture 18 of the ellipsoidal reflector 12 and between the negative focal plane 34 and the exit end 30 of the integrator box 26 (not shown), the apparent image size of the projection lamp will be increased to the point where images F, $F_1$, $F_2$ and $F_{1S}$ will overlap to provide the uniform illumination at the exposure area 38 as is desired.

From the foregoing it is readily apparent that there is herein provided a simple yet highly efficient means of increasing the illumination uniformity of a lamphouse used in professional photographic printing devices. A plurality of triangularly shaped reflectors are placed in an integrator box for the lamphouse such that the base of each of the triangles intersects the entrance end to the integrator box and an apex of each lies at the intersection of adjacent sides of the box. By proper sizing of the reflectors supplementary first reflection images can be directed into the quandrant centers of the projection plane to give the desired increase in illumination uniformity.

The invention has been described in detail with particular reference to preferred embodiments thereof, but it will be understood that variations and modifications can be effected within the spirit and scope of the invention.

I claim:

1. In photographic printing apparatus having a high intensity lamp, a transparency focal plane, a printing lens and projection area for receiving radiation images from said lamp through said transparency focal plane, a means for providing improved uniformity of the illumination level at the projection area, said means comprising:

an integrator box located between said lamp and said transparency focal plane, said integrator box having a series of highly reflective walls interconnected so as to give said box a substantially square cross-section with a first open end adjacent said lamp and a second open end adjacent said transparency focal plane; and a series of triangularly shaped reflective surfaces each having a base intersecting said first open end at adjacent walls of said integrator box and extending within said integrator box, the apex of each of said triangular surfaces extending to the intersection of said adjacent walls wherein said surfaces are oriented such that first reflection images therefrom will be directed into the quadrant centers of the projection area.

2. An improved integrator box for providing uniform illumination between a high intensity lamphouse and a projection plane, said integrator box including a first series of highly reflective interior surfaces interconnected to form a unit having a regular polygonal cross-section, and a second series of highly reflective interior surfaces, each of said second series of surfaces intersecting adjacent interior surfaces of said first series and being oriented so as to diverge from the projection path of said lamphouse as it progresses through said integrator box.

3. The apparatus of claim 2 wherein said first series of highly reflective interior surfaces include four plates interconnected to form a unit having a substantially square cross-section, and wherein said second series of highly reflective interior surfaces include four triangular plates oriented to have the base of each of said plates intersecting adjacent plates of said first series and have the apexes thereof extending to the intersection of said adjacent plates.

4. The apparatus of claim 3 wherein said base of each of said triangular plates is positioned at the end of said first series of plates adjacent said lamphouse.

* * * * *